United States Patent
Black et al.

(10) Patent No.: US 12,477,018 B2
(45) Date of Patent: Nov. 18, 2025

(54) CONTEXT SENSITIVE ALERTS INVOLVING MUTED USERS

(71) Applicant: Sony Interactive Entertainment Inc., Tokyo (JP)

(72) Inventors: Glenn Black, San Mateo, CA (US); Celeste Bean, San Mateo, CA (US); Michael Taylor, San Mateo, CA (US)

(73) Assignee: SONY INTERACTiVE ENTERTAINMENT INC., Tokyo (JP)

( * ) Notice: Subject to any disclaimer, the term of this patent is extended or adjusted under 35 U.S.C. 154(b) by 343 days.

(21) Appl. No.: 17/728,270

(22) Filed: Apr. 25, 2022

(65) Prior Publication Data

US 2023/0344880 A1 Oct. 26, 2023

(51) Int. Cl.
*H04L 65/1089* (2022.01)
*G06F 3/16* (2006.01)
*G06F 40/20* (2020.01)
*G10L 15/22* (2006.01)
*H04L 65/401* (2022.01)

(52) U.S. Cl.
CPC .......... *H04L 65/1089* (2013.01); *G06F 3/165* (2013.01); *G06F 40/20* (2020.01); *G10L 15/22* (2013.01); *G10L 2015/228* (2013.01)

(58) Field of Classification Search
CPC ................. H04L 65/1089; G10L 15/22; G10L 2015/228; G06F 40/20; G06F 3/165
See application file for complete search history.

(56) References Cited

U.S. PATENT DOCUMENTS

| | | | |
|---|---|---|---|
| 8,743,743 B1 * | 6/2014 | Mai | H04M 3/566 381/104 |
| 9,386,147 B2 * | 7/2016 | McDysan | H04M 3/568 |
| 11,082,465 B1 * | 8/2021 | Chavez | G06V 40/20 |
| 11,368,585 B1 * | 6/2022 | Shiver | H04N 7/15 |
| 2015/0156598 A1 * | 6/2015 | Sun | H04L 12/1822 348/14.07 |
| 2017/0230439 A1 * | 8/2017 | Totzke | H04N 7/155 |
| 2018/0351885 A1 * | 12/2018 | Agrawal | H04L 51/046 |
| 2019/0068389 A1 * | 2/2019 | Chitre | H04L 12/1863 |
| 2019/0318719 A1 * | 10/2019 | Copt | G10K 11/17857 |
| 2020/0028884 A1 * | 1/2020 | Childers | G10L 21/0208 |
| 2020/0110572 A1 * | 4/2020 | Lenke | G06F 3/167 |
| 2020/0273477 A1 | 8/2020 | Kwatra et al. | |
| 2020/0304643 A1 * | 9/2020 | Abraham | H04L 5/16 |
| 2021/0359872 A1 * | 11/2021 | Deole | H04R 29/004 |
| 2022/0051652 A1 | 2/2022 | Winsvold et al. | |
| 2023/0077283 A1 * | 3/2023 | Mehta | H04M 3/568 |

OTHER PUBLICATIONS

"International Search Report and Written Opinion", dated Jul. 20, 2023, from the counterpart PCT application PCT/US23/65951.

\* cited by examiner

*Primary Examiner* — Oleg Survillo
(74) *Attorney, Agent, or Firm* — Kilpatrick Townsend & Stockton LLP

(57) ABSTRACT

Alerts can be generated to inform a prime user to unblock another user, whose audio and/or video the prime user has blocked, owing to an emerging context that may be of interest to the prime user. The prime user can be informed of such a context and provided the ability to selectively view the blocked user's comments so the full context can be understood. This aims to help protect the prime user who may have been the subject of harassment from the blocked user originally causing the blocked user to be muted or otherwise blocked in the first place.

14 Claims, 5 Drawing Sheets

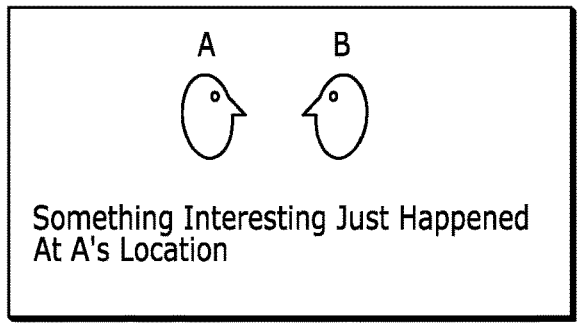
FIG. 6 — Context Example 1
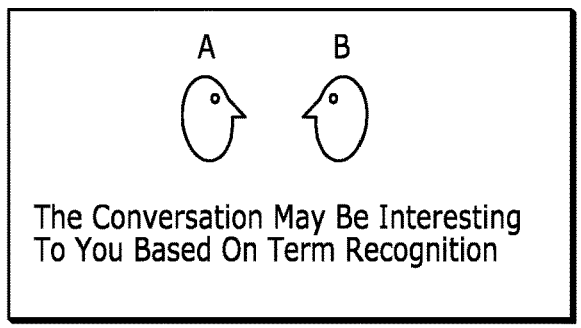
FIG. 7 — Context Example 2
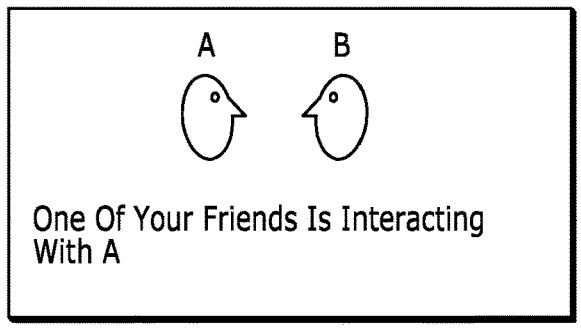
FIG. 8 — Context Example 3
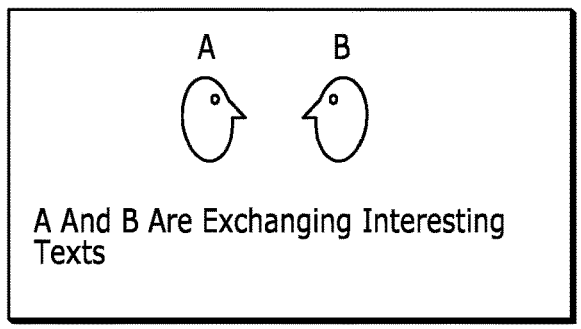
FIG. 9 — Context Example 4

CONTEXT SENSITIVE ALERTS INVOLVING MUTED USERS

FIELD

The present application relates generally to context sensitive alerts involving muted users.

BACKGROUND

As recognized herein, when a user has muted another user in a digital social setting, confusion can be caused because only part of a conversation will be seen/heard if the muted user is talking to a third, unmuted user.

SUMMARY

A device includes at least one computer storage that is not a transitory signal and that in turn includes instructions executable by at least one processor to receive a mute command. Responsive to the mute command, the instructions are executable to mute audio on a user terminal from a first participant in a computerized communication session and not mute audio on the user terminal from a second participant in the computerized communication session. Without receiving a command to unmute the first participant, the instructions are executable to automatically unmute audio on the user terminal from the first participant, or present a prompt to unmute the first participant advising of a context in the computerized communication session, or present text representing speech of the first participant.

In some examples, the mute command can be received from the user terminal and the prompt is presented on the user terminal. In other examples, the mute command is not received from the user terminal and the prompt is presented on a device other than the user terminal.

In example implementations, the instructions may be executable to input to a machine learning (ML) model contextual information derived from the computerized communication session, and receive from the ML model at least one indication of a context. In such implementations, the instructions can be executable to, without receiving a command to unmute the first participant, automatically unmute audio on the user terminal from the first participant, or present a prompt to unmute the first participant advising of a context in the computerized communication session, based at least in part on the indication of a context output by the ML model.

An example context may include at least one event at a location of a participant in the computerized communication session. Another example context may include at least one term spoken by a participant in the computerized communication session. Yet another example context can include at least one user identity such as a friend associated with a participant in the computerized communication session. Another example context includes at least one text sent by a participant in the computerized communication session, or at least one participant-to-participant interaction in the computerized communication session. Combinations of the above contexts may be used.

In some embodiments, the instructions can be executable to input to a computer program contextual information derived from the computerized communication session, receive from the computer program at least one indication of a context, and without receiving a command to unmute the first participant, automatically unmute audio on the user terminal from the first participant, or present a prompt to unmute the first participant advising of a context in the computerized communication session, based at least in part on the indication of a context output by the computer program.

In another aspect, a method includes providing input to at least one machine learning (ML) model information from a computerized communication session. The method also includes receiving output of the ML model representing a context of the computerized communication session, and automatically unblock, on a user terminal, audio and/or video from a participant in the computerized communication session responsive to the context, or provide an advisory to unblock the participant on the user terminal responsive to the context.

In another aspect, an assembly includes at least one user terminal with at least one processor programmed to execute instructions, at least one speaker configured to play audio, and at least one communication interface configured to exchange information in a computerized communication session. The instructions are executable by the processor to receive a block command, and responsive to the block command, block, from presentation on the user terminal, audio and/or video information from a first participant in a computerized communication session and not block from presentation on the user terminal audio and/or video information from a second participant in the computerized communication session. The instructions are executable to, without receiving a command to unblock the first participant, automatically unblock on the user terminal the first participant, or present a prompt to unblock the first participant advising of a context in the computerized communication session, or present text representing speech of the first participant.

The details of the present application, both as to its structure and operation, can be best understood in reference to the accompanying drawings, in which like reference numerals refer to like parts, and in which:

BRIEF DESCRIPTION OF THE DRAWINGS

FIGS. 6-10 illustrate example screen shots for various unmuting context examples;

DETAILED DESCRIPTION

Figure 1:
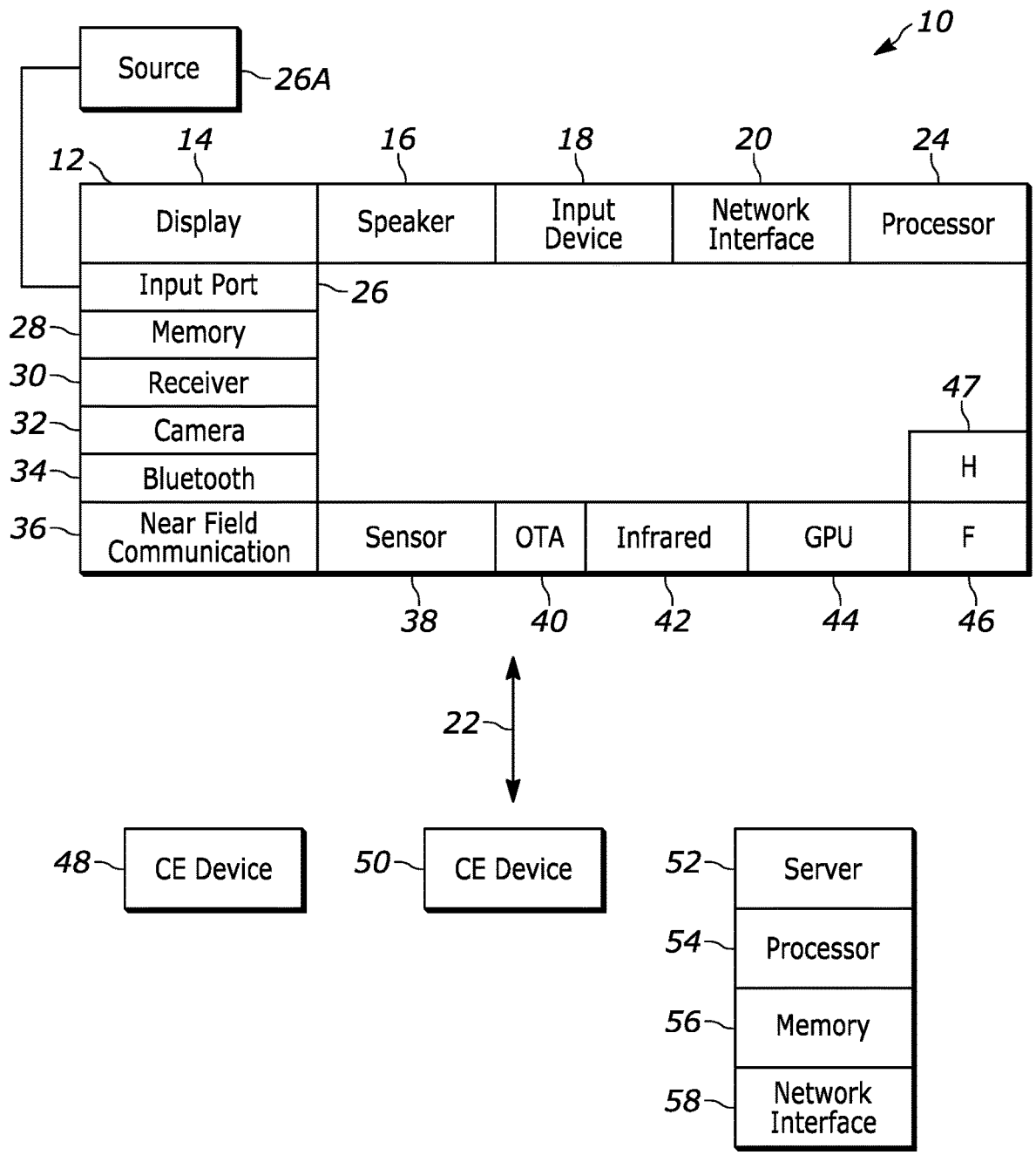
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage mediums 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of motion sensors such as accelerometers, gyroscopes, and magnetometers to determine the location and orientation of the AVD 12 in three dimension or by an event-based sensor such as an event detection sensor (EDS) outputting binary indications of change in direction of a parameter.

Continuing the description of the AVD 12, in some embodiments the AVD 12 may include one or more cameras 32 that may be a thermal imaging camera, a digital camera such as a webcam, an event-based sensor, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12 and/or CE devices. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
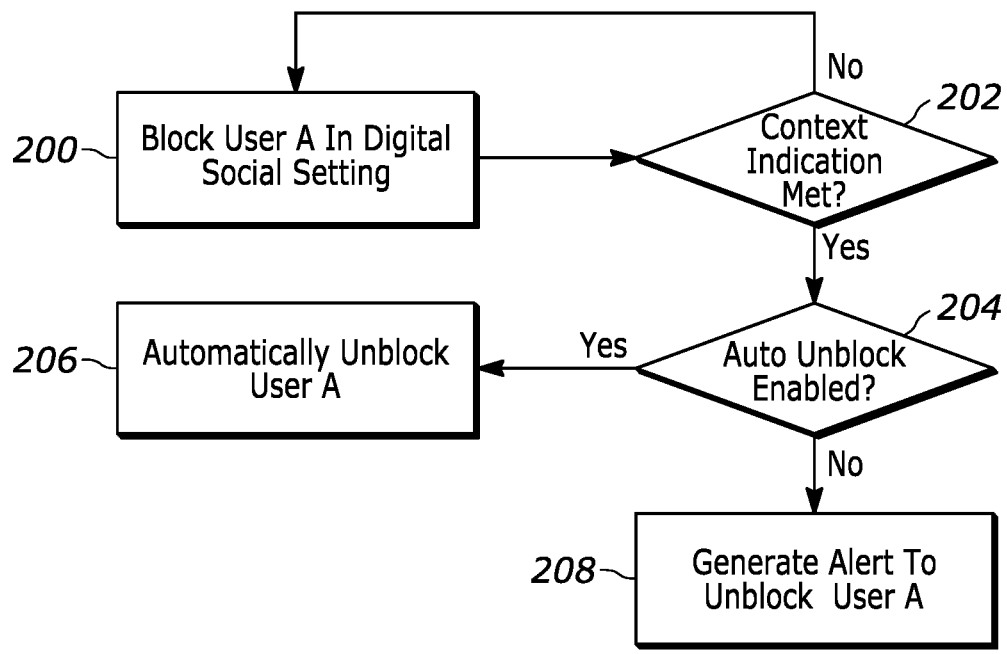
FIG. 2 illustrates example logic in example flow chart format consistent with present principles.

Turning now to FIG. 2, at block 200 a mute command is received at a user terminal, such as any of the devices described herein, or from a companion device of the user terminal (such as a mobile phone) to block, on the user terminal, a first participant in a computerized communication session such as a chat session or other digital social session. Examples of blocking a participant can include muting audio on the user terminal from the first participant. Another example of blocking a participant is by preventing text input by the participant from appearing on the user terminal. Another example of blocking a participant is by preventing the user terminal from presenting video from the participant, either all video or in some cases only video in which gesticular motion in video is sensed to satisfy a threshold motion, thereby blocking video presentation of the participant only when the video is sensed as possibly including gestures that could be offensive. Yet again, for sufficiently rapid gesture recognition, only video from the participant of gestures evaluated as being offensive may be prevented from being presented on the user terminal.

The computerized communication session may include a user of the user terminal, the first participant, and a second participant, for example, who is not muted at the user terminal. In response to the mute command, in an example, audio of the first participant's speech is muted at the user terminal.

Proceeding to decision diamond 202, it is determined whether a context indication has been met indicating that the user of the user terminal may wish to learn about what the muted (first) participant is saying or otherwise attempting to communicate. Context determination is described further below. If the context indicates that the user of the user terminal may wish to learn about what the muted (first) participant is saying, the logic moves to decision diamond 204 in some examples.

At decision diamond 204 it is determined whether automatic unblocking based on context has been enabled. If so, the logic moves to block 206 to, without receiving a command to unmute the first participant, automatically unblock audio on the user terminal from the first participant. On the other hand, if automatic unblocking based on context has not been enabled, the logic moves from decision diamond 204 to block 208 to, without receiving a command to unblock the first participant, automatically present a prompt on the user terminal and/or companion device to unblock the first participant advising of a context in the computerized communication session, or to present text representing speech of the first participant.

Figure 3:
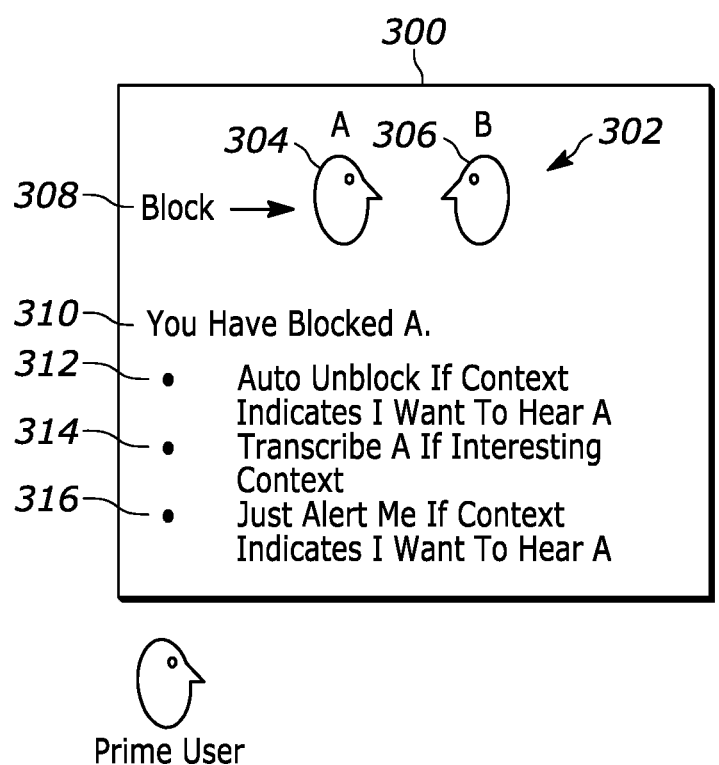
FIG. 3 illustrates an example screen shot for unmute selection consistent with present principles.

FIG. 3 illustrates. A display 300 such as any display herein can present a user interface (UI) 302 in which, in the non-limiting example shown, images or avatars 304, 306 are presented of the first and second participants (participants "A" and "B" in the UI). An indication 308 may be presented indicating to the user of the user terminal ("prime user" in the example of FIG. 3) that the first participant has been muted on the user terminal.

In the example shown, an advisory 310 further alerts the user that participant "A" has been blocked. Plural selectors may be provided to allow the user to decide how to deal with an interesting context that may be detected according to disclosure below. A first selector 312 may be selected to cause the user terminal to automatically unblock the first participant "A" if the context so indicates, so that the voice of the first participant "A" will be played on one or more speakers of the user terminal if audio was muted, or an image may be presented if video was muted, or text entry from the participant may be presented if this had been disabled.

A second selector 314 may be selected to cause the user terminal to automatically transcribe incoming (but muted) voice signals from the first participant "A" using, e.g., a speech-to-text engine and present the text on the user terminal, should context so indicate. Yet a third selector 316 may be presented and can be selected to cause the user terminal to automatically present an alert that context indicates that the user may wish to manually unblock the first participant "A".

Figure 4:
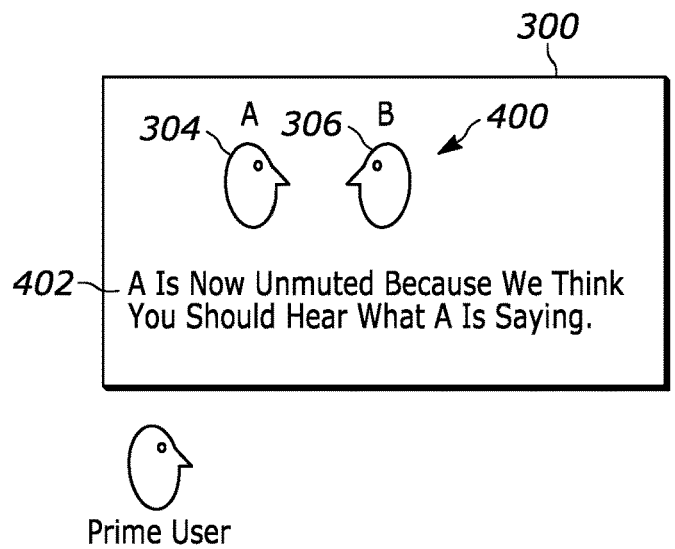
FIG. 4 illustrates an example screen shot for auto unmute consistent with present principles.

FIG. 4 illustrates that responsive to the user opting for the first selector 312 in FIG. 3, if subsequent context is evaluated as interesting, a UI 400 may be presented showing the images or avatars 304, 306 of the first and second participants may be presented along with an advisory 402 that the first participant is now unmuted on the user terminal.

Figure 5:
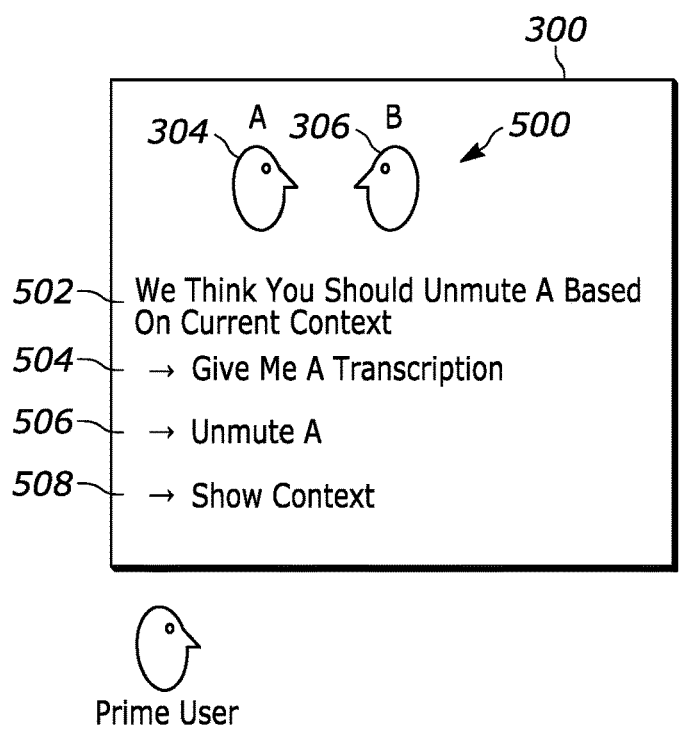
FIG. 5 illustrates an example screen shot for manual unmute consistent with present principles.

FIG. 5 illustrates that responsive to the user opting for the third selector 316 in FIG. 3, if subsequent context is evaluated as interesting, a UI 500 may be presented showing the images or avatars 304, 306 of the first and second participants may be presented along with an advisory 502 that the prime user should consider unmuting or otherwise learning what the muted participant is saying. In the non-limiting example shown, this UI may include a first selectable option 504 to render a text transcription of the speech of the muted participant (in cases in which the second selector 314 in FIG. 3 is not provided). The UI 500 may also include a second selectable option 506 to unblock the muted participant. Also, the UI 500 may include a third selectable option 508 to show what the putatively interesting context is, prior to the prime user deciding whether and how to learn what the blocked participant is saying.

Figure 5A:
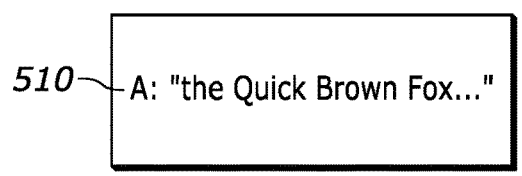
FIG. 5A illustrates an example screen shot with a muted user's voice transcribed to text.

Responsive to selection of the first option 504 from the UI 500 of FIG. 5 or selection of the second selector 314 from FIG. 3, FIG. 5A illustrates that a transcription 510 may be presented on the display showing the terms spoken or texted or gestured by the blocked participant.

FIGS. 6-10 illustrates respective UIs 600, 700, 800, 900, 1000 of advisories concerning examples of putatively interesting context. In FIG. 6, the prime user is advised that an interesting event such as a noise evaluated as being interesting or a visual event evaluated as being interesting at the physical location of a participant such as the blocked participant as sensed by, e.g., a camera or microphone at the location. Other examples may include motion as sensed by an IMU at the location, indicating an earthquake.

On the other hand, in FIG. 7 the prime user is advised that the context of the conversation between the participants in the session may be interesting based on an interesting term being recognized in speech from one or both participants as detected by a microphone or microphones or based on text input or gesture recognition. Yet again, in FIG. 8 the prime user is advised that the context of the session may be interesting on the basis of a user identity associated with a participant in the computerized communication session evaluated as being interesting. For example, using the login information of a participant, the prime user's friend list may be accessed and if the participant is on the list, an interesting context may be inferred. Or, using the login information of a participant it may be inferred that the participant is famous or important, in which case an interesting context may be inferred.

Figure 10:
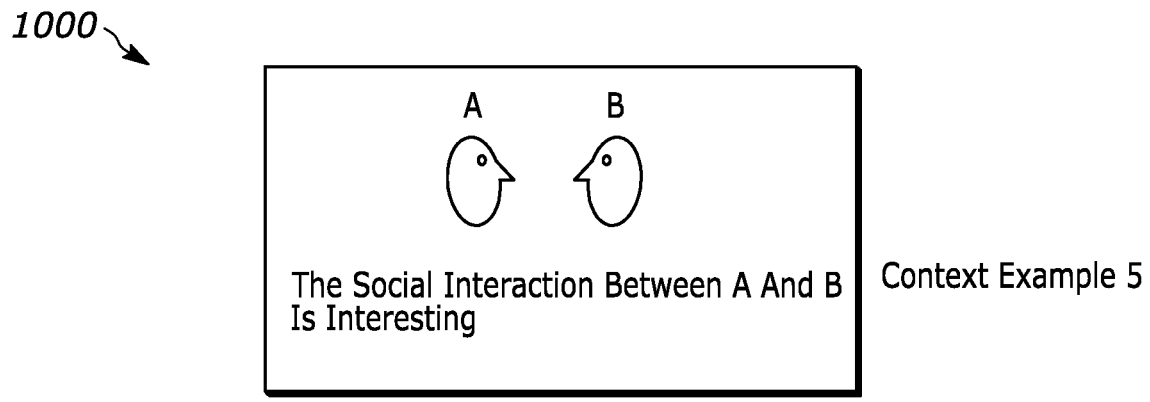

FIG. 9 indicates another advisory of example interesting context, in this case, that participants in the session are exchanging interesting texts as evaluated based on term recognition in the texts. FIG. 10 indicates another advisory of example interesting context, in this case, that a social interaction between participants in the session is interesting as indicated by, e.g., parallel social media posts the participants are exchanging.

The above are but five non-limiting examples of context identified as interesting for the purpose of unmuting or otherwise learning what a muted participant in a computerized communication session is saying. Another example is the detection of interesting or offensive gestures, such as gang signs, middle finger, bunny ears, etc. In other words, a participant making such gestures near a user's avatar, of which the user would not be aware, could be flagged to be blocked.

Interesting context may be predefined by an expert and provided to a rule-based engine or to one or more machine learning (ML) models trained to recognize interesting context based on sensor input, such as microphone or camera or motion sensor input.

Figure 11:
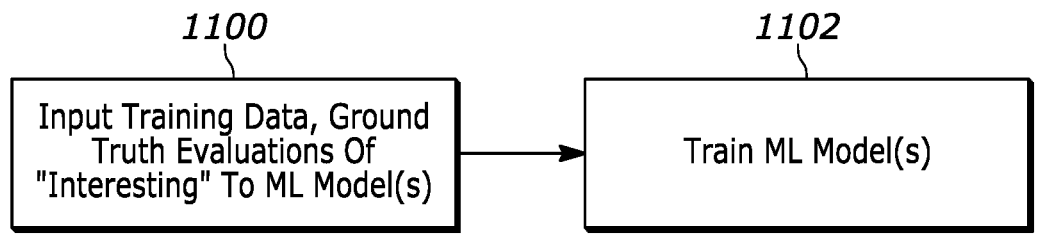
FIG. 11 illustrates example logic in example flow chart format for training one or more machine learning (ML) models to recognize interesting context.
Figure 12:
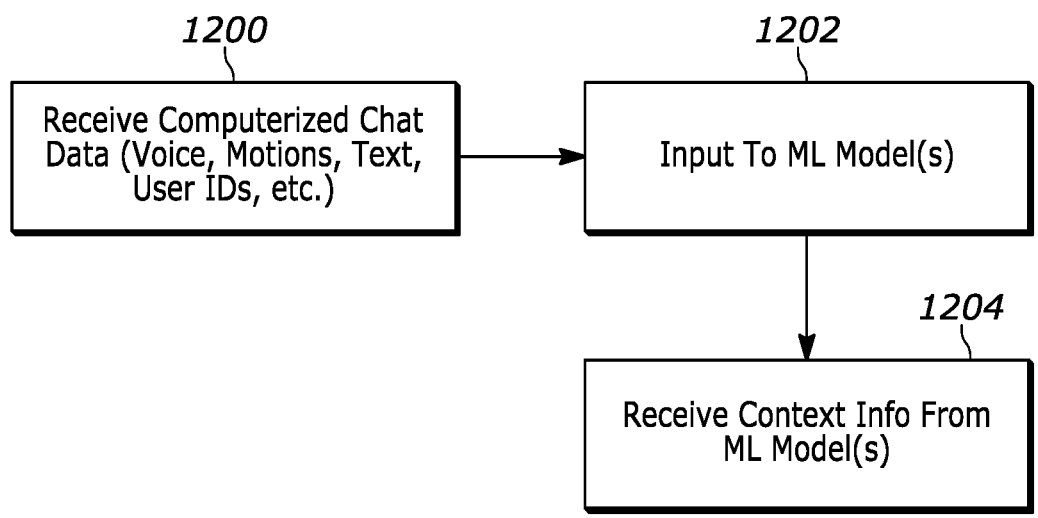
FIG. 12 illustrates additional example logic in example flow chart format consistent with present principles.

FIGS. 11 and 12 illustrate further in the context of audio, it being understood that the same principles apply to text and gestures. In FIG. 11, at block 1100 a training set of computerized communication session data along with ground truth tags correlating the data to "interesting", "uninteresting", and "flag for blocking" evaluations is input to one or more ML models. The data may be derived from audio and video and motion sensing of computerized communication sessions and their locations from a communications library. The model(s) are trained on the data at block 1102.

FIG. 12 illustrates that for a subsequent computer communication session, at block 1200 the communication session data including participant voice data, participant image data, motion sensing data, and participant ID information may be received. The data is input to the ML model(s) at block 1202. At block 1204 the output of the ML model(s) is received as indications as to whether a current context of the computer communication session is interesting or offensive for purposes of blocking.

While the particular embodiments are herein shown and described in detail, it is to be understood that the subject matter which is encompassed by the present invention is limited only by the claims.

What is claimed is:

1. A device, comprising:
   at least one computer storage that is not a transitory signal and that comprises instructions executable by at least one processor to:
   receive a mute command;
   responsive to the mute command, mute audio on a user terminal from a first participant in a computerized communication session and not mute, on the user terminal, audio from a second participant in the computerized communication session;
   without receiving a command to unmute the first participant, automatically present a prompt to unmute the first participant advising of a context in the computerized communication session, or present text representing speech of the first participant.

2. The device of claim 1, comprising the at least one processor programmed with the instructions.

3. The device of claim 1, wherein the mute command is received from the user terminal and the prompt is presented on the user terminal.

4. The device of claim 1, wherein the mute command is not received from the user terminal and the prompt is presented on a device other than the user terminal.

5. The device of claim 1, wherein the instructions are executable to:
   input to a machine learning (ML) model contextual information derived from the computerized communication session; and
   receive from the ML model at least one indication of a context.

6. The device of claim 5, wherein the instructions are executable to:
   without receiving a command to unmute the first participant, automatically unmute audio on the user terminal from the first participant, or present a prompt to unmute the first participant advising of a context in the computerized communication session, based at least in part on the indication of a context output by the ML model.

7. The device of claim 6, wherein the context comprises at least one event at a location of a participant in the computerized communication session.

8. The device of claim 6, wherein the context comprises at least one term spoken by a participant in the computerized communication session.

9. The device of claim 6, wherein the context comprises at least one user identity associated with a participant in the computerized communication session.

10. The device of claim 6, wherein the context comprises at least one text message sent by a participant in the computerized communication session.

11. The device of claim 6, wherein the context comprises at least one participant-to-participant interaction in the computerized communication session.

12. The device of claim 1, wherein the instructions are executable to:
    input to a computer program contextual information derived from the computerized communication session;
    receive from the computer program at least one indication of a context; and
    without receiving a command to unmute the first participant, automatically unmute audio on the user terminal from the first participant, or present a prompt to unmute the first participant advising of a context in the computerized communication session, based at least in part on the indication of a context output by the computer program.

13. An assembly comprising:
    at least one user terminal comprising:
    at least one processor programmed to execute instructions;
    at least one speaker configured to play audio; and
    at least one communication interface configured to exchange information in a computerized communication session, wherein the instructions are executable by the at least one processor to:
    receive a block command;
    responsive to the block command, block, from presentation on the user terminal, audio and/or video information from a first participant in a computerized communication session and not block, on the user terminal, audio and/or video information from a second participant in the computerized communication session;
    without receiving a command to unblock the first participant, present a prompt to unblock the first participant advising of a context in the computerized communication session, or present text on the user terminal representing speech of the first participant.

14. The assembly of claim 13, wherein audio is muted from the first participant responsive to the block command.

* * * * *